United States Patent
Pietzsch et al.

(10) Patent No.: US 11,292,464 B2
(45) Date of Patent: Apr. 5, 2022

(54) APPARATUS FOR A DRIVER ASSISTANCE SYSTEM

(71) Applicant: VEONEER SWEDEN AB, Vargarda (SE)

(72) Inventors: Sylvia Pietzsch, Billdal (SE); Eugen Schaefer, Unterschleissheim (DE)

(73) Assignee: VEONEER SWEDEN AB, Vargarda (SE)

( * ) Notice: Subject to any disclaimer, the term of this patent is extended or adjusted under 35 U.S.C. 154(b) by 71 days.

(21) Appl. No.: 16/482,302

(22) PCT Filed: Feb. 12, 2018

(86) PCT No.: PCT/EP2018/053462
§ 371 (c)(1),
(2) Date: Jul. 31, 2019

(87) PCT Pub. No.: WO2018/146315
PCT Pub. Date: Aug. 16, 2018

(65) Prior Publication Data
US 2019/0344787 A1 Nov. 14, 2019

(30) Foreign Application Priority Data
Feb. 13, 2017 (EP) .................................... 17155915

(51) Int. Cl.
*G06T 7/00* (2017.01)
*B60W 30/12* (2020.01)
(Continued)

(52) U.S. Cl.
CPC ......... *B60W 30/12* (2013.01); *G06K 9/00798* (2013.01); *G06K 9/00805* (2013.01);
(Continued)

(58) Field of Classification Search
None
See application file for complete search history.

(56) References Cited

U.S. PATENT DOCUMENTS 9,127,956 B2  9/2015  Einecke et al.
9,261,601 B2  2/2016  Ibrahim
(Continued)

FOREIGN PATENT DOCUMENTS

DE   10 2015 013 085 A1   3/2016

OTHER PUBLICATIONS

International Search Report and Written Opinion of PCT/EP2018/053462, dated May 14, 2018.
(Continued)

*Primary Examiner* — Delomia L Gilliard
(74) *Attorney, Agent, or Firm* — Dickinson Wright PLLC

(57) ABSTRACT

A driver assistance apparatus being configured to determine an object position sequence for each of a plurality of objects and generate an object track to approximate each respective object position sequence. The apparatus also sorts the object tracks in to at least one object group according to the value of at least one parameter of each of the object tracks. For each object group, a swarm function is generated to approximate the object position sequences of the object tracks that are members of the respective object group. A swarm lane is generated according to each the swarm function, the swarm lane portion representing a portion of a lane. A corresponding method is also provided.

19 Claims, 13 Drawing Sheets

(51) Int. Cl.
  *G06T 7/246* (2017.01)
  *G06T 7/73* (2017.01)
  *G06K 9/00* (2022.01)
  *G08G 1/16* (2006.01)
  *B60W 30/14* (2006.01)
  *B60W 50/00* (2006.01)

(52) U.S. Cl.
  CPC .............. *G06T 7/246* (2017.01); *G06T 7/73* (2017.01); *G08G 1/167* (2013.01); *B60W 30/14* (2013.01); *B60W 50/0097* (2013.01); *B60W 2420/42* (2013.01); *B60W 2420/52* (2013.01); *B60W 2554/00* (2020.02); *G06T 2207/30256* (2013.01); *G06T 2207/30261* (2013.01)

(56) References Cited

U.S. PATENT DOCUMENTS

| | | | |
|---|---|---|---|
| 9,612,123 B1* | 4/2017 | Levinson | B60W 30/09 |
| 9,738,279 B2 | 8/2017 | Eichhorn et al. | |
| 2008/0291276 A1* | 11/2008 | Randler | B62D 1/28 |
| | | | 348/149 |
| 2013/0173232 A1* | 7/2013 | Meis | G08G 1/167 |
| | | | 703/2 |
| 2014/0160276 A1* | 6/2014 | Pliefke | G06K 9/00805 |
| | | | 348/118 |
| 2014/0358321 A1 | 12/2014 | Ibrahim | |
| 2015/0022759 A1 | 1/2015 | Huey et al. | |
| 2015/0025789 A1 | 1/2015 | Einecke et al. | |
| 2016/0039413 A1* | 2/2016 | Eichhorn | G01C 21/3407 |
| | | | 701/26 |
| 2017/0167883 A1* | 6/2017 | Pink | G01C 21/30 |

OTHER PUBLICATIONS

English translation of second office action regarding corresponding JP App. No. 2019-536022; dated Jul. 1, 2021.

* cited by examiner

APPARATUS FOR A DRIVER ASSISTANCE SYSTEM

CROSS-REFERENCE TO RELATED APPLICATIONS

This application is a 35 U.S.C. § 371 national phase of PCT International Application No. PCT/EP2018/053462, filed Feb. 12, 2018, which claims the benefit of priority under 35 U.S.C. § 119 to European Patent Application No. 17155915.6, filed Feb. 13, 2017, the contents of which are incorporated herein by reference in their entirety.

FIELD OF THE INVENTION

The present invention relates to a driver assistance system, and more particularly an apparatus for a driver assistance system for determining lanes.

BACKGROUND

In order that accidents are avoided and driving laws are complied with, driving a vehicle requires concentration from the driver, often for prolonged periods. Lapses in this concentration from the driver lead to increased risk of accidents and/or non-compliance with the law. Increasingly, driver assistance systems that are capable of performing an assistance function are fitted to the driver's vehicle (hereinafter referred to as the "ego vehicle"). For example, the assistance function may include relieving the driver of some of his/her driving duties, or may include monitoring the driver's performance in order that errors may be anticipated and/or avoided.

Alternatively, the assistance function may introduce some additional functionality not ordinarily available to a driver. Such additional functionality may allow the driver to have more information than they ordinarily would do, in order that they can perform a driving task more easily, for example. A rear-facing camera for example, which can provide a video feed to a driver when reversing, constitutes an example of such an additional functionality. In this example, the video feed allows the driver to reverse-park more easily and safely but is not actually necessarily monitoring the driver's performance or performing some task for them.

Driver assistance systems therefore mitigate risk for the driver of the ego vehicle, his/her passengers, and other road users. Ultimately, it is thought that driver assistance functions will be developed to such an extent that they can control most, if not all, aspects of driving an ego vehicle. In this case, the driver assistance systems will be an autonomous driving system.

Driver assistance systems may include active devices, which are capable of actively intervening in the operation of the ego vehicle, for example by changing the speed of the ego vehicle. Driver assistance systems may alternatively or additionally include passive devices, which, for example, notify the driver of a particular driving situation so that the user can react to the notification. For example, the driver assistance system may make an audible signal when the ego vehicle deviates across a road marking unexpectedly. A given ego vehicle may include both passive and active systems.

In general, a driver assistance system may include at least one sensor. A particular sensor may measure parameters of the vehicle or its surroundings. The data from such a sensor is processed in order to draw conclusions based on the sensor measurements. The driver assistance system may then trigger some interaction with the ego vehicle, or with the driver, based on the result of the conclusions.

Examples of potential sensors used in driver assistance systems include RADAR systems, LIDAR systems, cameras, inter-vehicle communications, and vehicle-to-infrastructure communications.

A driver assistance system may be used to control a variety of different aspects of driving safety or driver monitoring. For example, ACC ("Adaptive Cruise Control") may use a RADAR or LIDAR system to monitor the distance between the ego vehicle and the vehicle immediately ahead on the road. The sensor is able to determine the distance to the vehicle ahead. The driver assistance system also knows, and can control, the velocity of the ego vehicle. The driver assistance system controls the speed of the ego vehicle in order to maintain a predefined safety condition relative to the vehicle ahead. For example, the driver assistance system may control the speed to maintain a certain distance between the ego vehicle and the vehicle ahead. Alternatively, the driver assistance system may control the speed to maintain a predetermined time-period between the vehicle ahead passing a point, and the ego vehicle passing the same point.

There are existing driving assistance systems that monitor the surroundings of the ego vehicle to identify the position of other vehicles and entities on or around the road on which the ego vehicle is travelling. By monitoring the surroundings, such a driver assistance system can maintain a situational awareness for the ego vehicle. This situational awareness can be used to notify the user of potential hazards. For example, the ego vehicle changing lanes when a second vehicle is in a blind spot, or detecting a second vehicle cutting-in to the path of the ego vehicle, may be notified to a driver. The situational awareness may also be used as an input to an ACC system, for example.

Providing a detailed and reliable situational awareness is important for a number of different driver assistance functionalities.

In the majority of driving situations, vehicles are travelling in lanes. That is, the road is split into a number of generally parallel lanes, each of which forms a corridor along which vehicles should travel. Sometimes the lanes are designated by road markings on the road surface, which visually indicate to a driver where the boundaries of the lanes are. Sometimes there are no road markings, and the driver simply has to take care not to stray into a lane of oncoming traffic. Sometimes the lane markings change along a particular section of road. For example, when work is being done to a road, the lanes may be narrowed relative to their normal configuration.

In situations where the lane markings are obscured from view (for example, by snow), or where road markings are not present, it is not possible for a driver assistance system to identify the position and dimensions of the lanes by processing output data from a camera, for example. Lane markings may also be obscured by other vehicles or objects, or simply the camera may not be able to distinguish visually the lane markings beyond a certain distance from the ego vehicle.

It is an object of the invention to provide an improved apparatus for a driver assistance system and method of operating an apparatus for a driver assistance system, which seeks to address some or all of these issues.

According to the present invention, there is provided an apparatus for a motor vehicle driver assistance system, the apparatus being operable to determine the position of a portion of at least one lane of a road on which the vehicle is travelling, the apparatus being configured to: determine an object position sequence for each of a plurality of objects; generate an object track to approximate each respective object position sequence; sort the object tracks in to at least one object group according to the value of at least one parameter of each of the object tracks; for each object group, generate a swarm function to approximate the object position sequences of the object tracks that are members of the respective object group; generate a swarm lane portion according to each the swarm function, the swarm lane portion representing a portion of a lane.

Advantageously, the apparatus is further configured to transform each object position sequence into the rest-frame of the vehicle.

Conveniently, the apparatus is further configured to discard objects that are static relative to the road on which the vehicle is travelling.

Optionally, each of the at least one swarm functions defines a center line of the corresponding swarm lane portion.

Advantageously, the apparatus is configured to generate a left lane line with a left lateral offset from the center line and a right lane line with a right lateral offset from the center line.

Conveniently, the right lateral offset is equal to the left lateral offset, which is equal to half of a lane width.

Optionally, the swarm lane portion extends forwards from the vehicle to a maximum swarm lane distance.

Advantageously, the apparatus is configured to receive an input lane portion derived using the detection of road markings by sensors mounted to the vehicle, wherein the input lane portion extends forwards from the vehicle to a maximum input lane distance, and; wherein the swarm lane portion extends beyond maximum input lane distance.

Conveniently, each object track has a double polynomial form including a first polynomial function and a second polynomial function, the first and second polynomial functions being equal at a polynomial point of equality.

Optionally, the first derivative of each object track function evaluated at the polynomial point of equality is equal to the first derivative of the second polynomial function evaluated at the polynomial point of equality.

Advantageously, the second derivative of each object track function evaluated at the polynomial point of equality is equal to the second derivative of the second polynomial function evaluated at the polynomial point of equality.

Conveniently, the swarm function has a double clothoid form including a first clothoid function and a second clothoid function, the first and second clothoid functions being equal at a clothoid point of equality.

Optionally, during the generation of the swarm function, an intermediate polynomial function is generated function to approximate the object position sequences of the object tracks that are members of the respective object swarm, and the swarm function is determined in terms of the intermediate polynomial function.

Advantageously, the object tracks are sorted according to a value of a constant term in each object track.

According to the present invention, a method for a motor vehicle driver assistance system is provided, the method for determining the position of a portion of at least one real-world lane of a road on which the vehicle is travelling, the method including the steps of: determining an object position sequence for each of a plurality of objects; generating an object track to approximate each respective object position sequence; sorting the object tracks in to at least one object group according to the value of at least one parameter of each of the object tracks; for each object group, generating a swarm function to approximate the object position sequences of the object tracks that are members of the respective object group; generating a swarm lane portion according to each the swarm function, the swarm lane portion representing a portion of a real-world lane.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
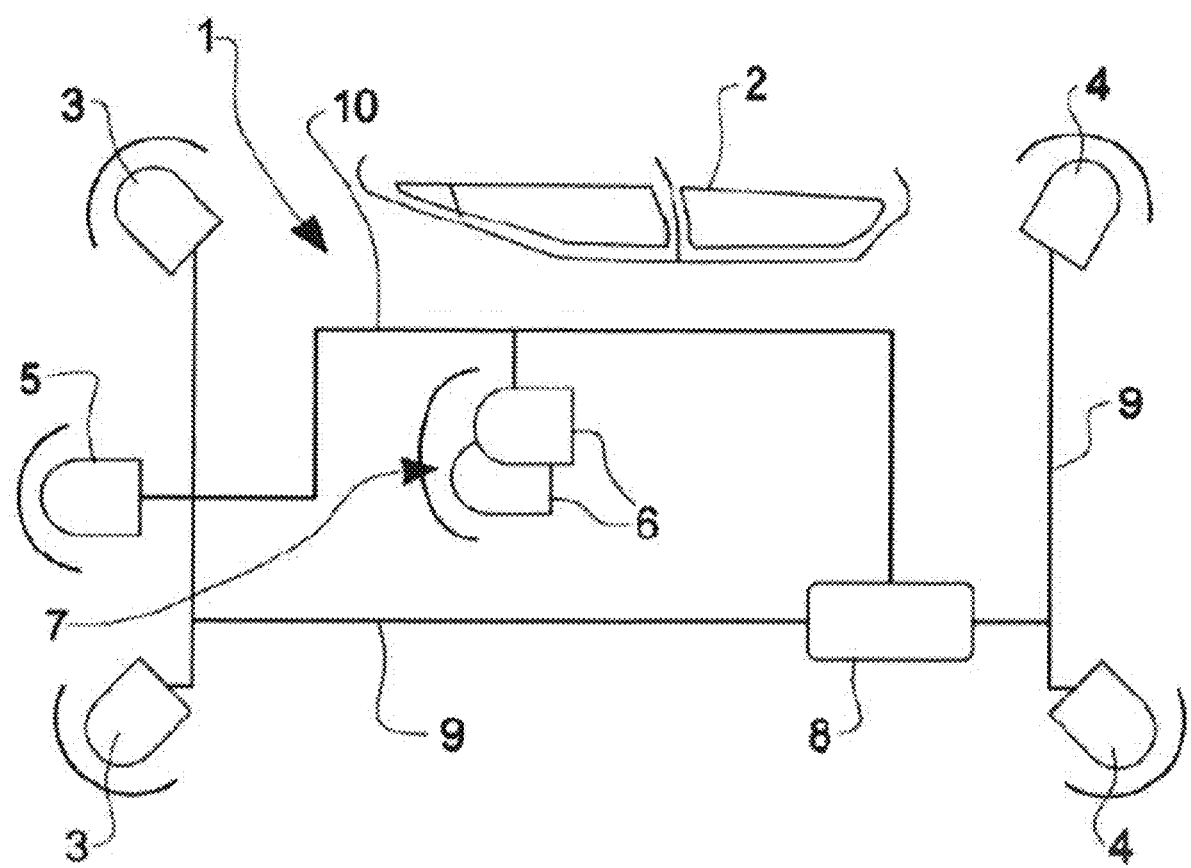
FIG. 1 shows a vehicle with a driver assistance system of a type suitable for use with the present invention.

Turning now to consider FIG. 1 in more detail, there is illustrated a schematic representation of an exemplary driver assistance system 1 installed in an ego vehicle 2 (only one side panel of which is denoted in FIG. 1 to indicate the vehicle's orientation). The safety system 1 includes a number of different types of sensor mounted at appropriate positions on the ego vehicle 2. In particular, the system 1 illustrated includes: a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed longrange radar ("LRR") sensor 5 mounted centrally at the front of the vehicle 2, and a pair of generally forwardly directed optical sensors 6 forming part of a stereo vision system ("SVS") 7 which may be mounted, for example, in the region of the upper edge of the vehicle's windscreen. The various sensors 3-6 are operatively connected to a central electronic control system which is typically provided in the form of an integrated electronic control unit 8 mounted at a convenient location within the vehicle. In the particular arrangement illustrated, the front and rear MRR sensors 3, 4 are connected to the central control unit 8 via a conventional Controller Area Network ("CAN") bus 9, and the LRR sensor 5 and the sensors of the SVS 7 are connected to the central control unit 8 via a faster FlexRay serial bus 9, also of a type known per se.

Collectively, and under the control of the control unit 8, the various sensors 3-6 can be used to provide a variety of different types of driver assistance functionalities such as, for example: blind spot monitoring; adaptive cruise control; collision prevention assist; lane departure protection; and rear collision mitigation.

Figure 2:
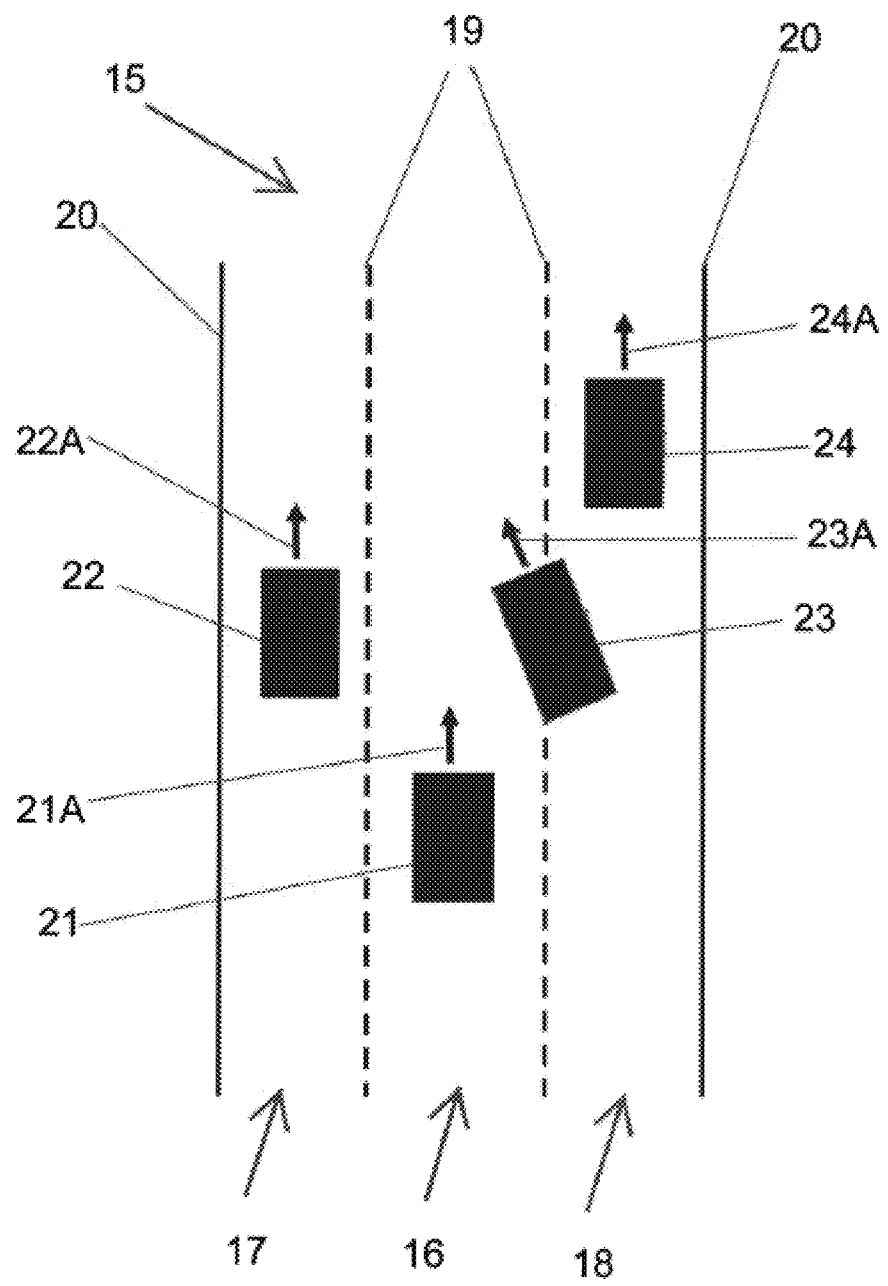
FIG. 2 shows a first schematic bird's-eye view of a driving scenario.

FIG. 2 shows a bird's-eye schematic view of a typical driving situation on a road 15. The road 15 has three lanes along which traffic can travel: a central traffic lane 16, a left lane 17 and a right lane 18. The left lane 17 is separated from the central lane 16 by a lane marking 19; similarly, the right lane 18 is separated from the central lane 16 by another lane marking 19. The outer limit of the right lane 18 is designated by a solid lane marking 20; similarly, the outer limit of the left lane 17 is designated by another solid lane marking 20.

An ego vehicle 21 is shown travelling along the central lane 16. The direction of travel of the ego vehicle 21 is shown by an arrow 21A. Three other vehicles, 22, 23, and 24 are also shown travelling along the road 15. The direction of travel 22A, 23A, 24A for each of the other vehicles 22, 23, 24 is also shown in FIG. 2.

Evidently, all of the vehicles shown in FIG. 2 are travelling in generally the same direction (upwards). Accordingly, the road 15 of FIG. 2 corresponds, for example, to half of a highway or motorway. A corresponding second half of the highway or motorway is not shown, but would be located to one side (either to the right or to the left, as seen in FIG. 2) of the road 15 (which side clearly depends on the country in which the road is located). The vehicles on the second half of the highway or motor would travel in generally the opposite direction to the vehicles on the road 15.

Figure 3:
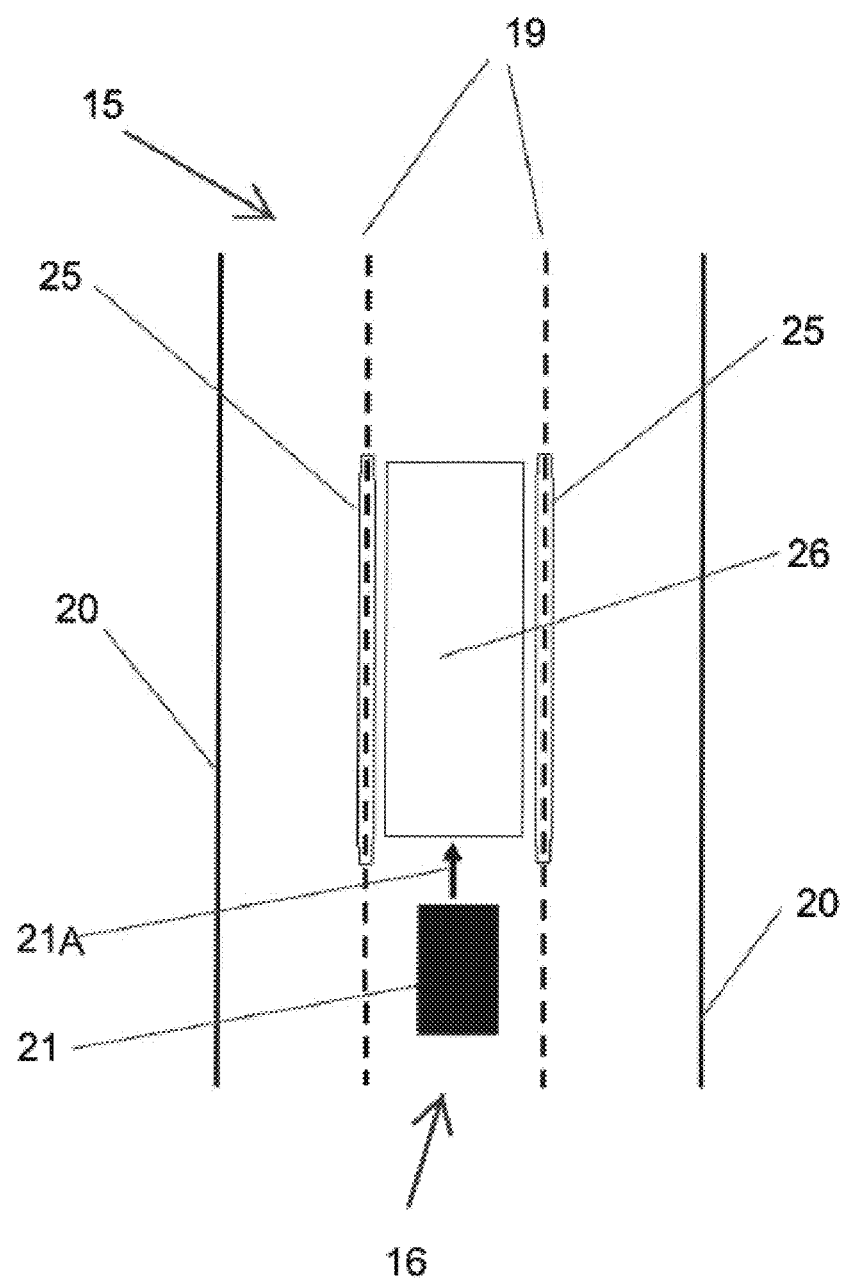
FIG. 3 shows a second schematic bird's-eye view of a driving scenario.

FIG. 3 shows a similar section of road 15 in a slightly different scenario to that shown in FIG. 2. In FIG. 3, the ego vehicle 21 is shown travelling along the road 15 in the central lane 16. The ego vehicle 21 is fitted with a driver assistance system, which includes a camera. The camera is a forward-facing camera and generally views the road ahead of the ego vehicle 21. The driver assistance system uses visual information from the camera to detect a portion of the road markings 19 in front of the ego vehicle 21. The portion of each road marking 19 that is detected by the driver assistance system is designated by respective line marking detection areas 25. It will be noted that there exists a maximum distance from the ego vehicle out to which the lane markings 19 can be detected by the driver assistance system. The driver assistance system may also detect portions of the outer lane markings 20, if these are visible to the camera. Such outer lane marking detections are not shown in FIG. 3.

Between the detected portions 25 of the lane markings 19, the driver assistance system designates the lane 26.

Figure 4A:
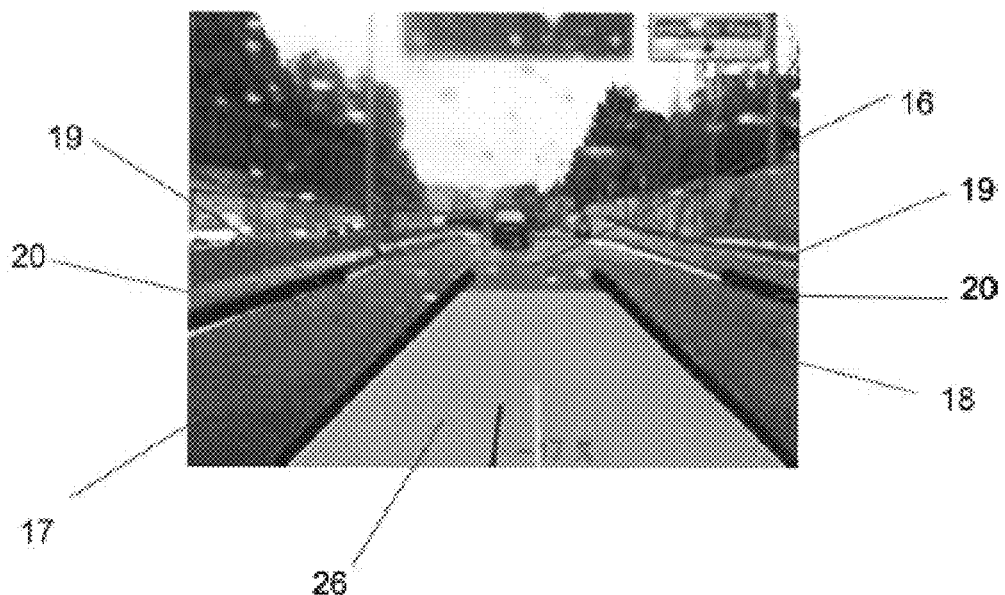
FIG. 4A shows a camera-view of a driving scenario.

FIG. 4A shows a view from a camera of the sort described with respect to FIG. 3. Overlaid on the view is the lane area 26 and the detected portions of the line markings 19. It will be apparent that the detected portions of the lane markings 19 and the outer lane markings 20 only extend to a maximum distance from the ego vehicle.

Figure 4B:
FIG. 4B shows a driving scenario.

FIG. 4B shows a scenario in which it is difficult or impossible for the system to detect road markings because the road markings are partially or fully obscured from the camera's view by other vehicles. Such as situation may occur, for example, in very heavy traffic or in a traffic jam.

Figure 4C:
FIG. 4C shows a driving scenario.

FIG. 4C shows a second example scenario in which it is difficult or impossible to detect road markings because the road markings are obscured from the camera's view by snow. It will be appreciated that there are other reasons why it may not be possible for the camera to detect the road markings as well as those illustrated by FIGS. 4B and 4C.

Figure 5:
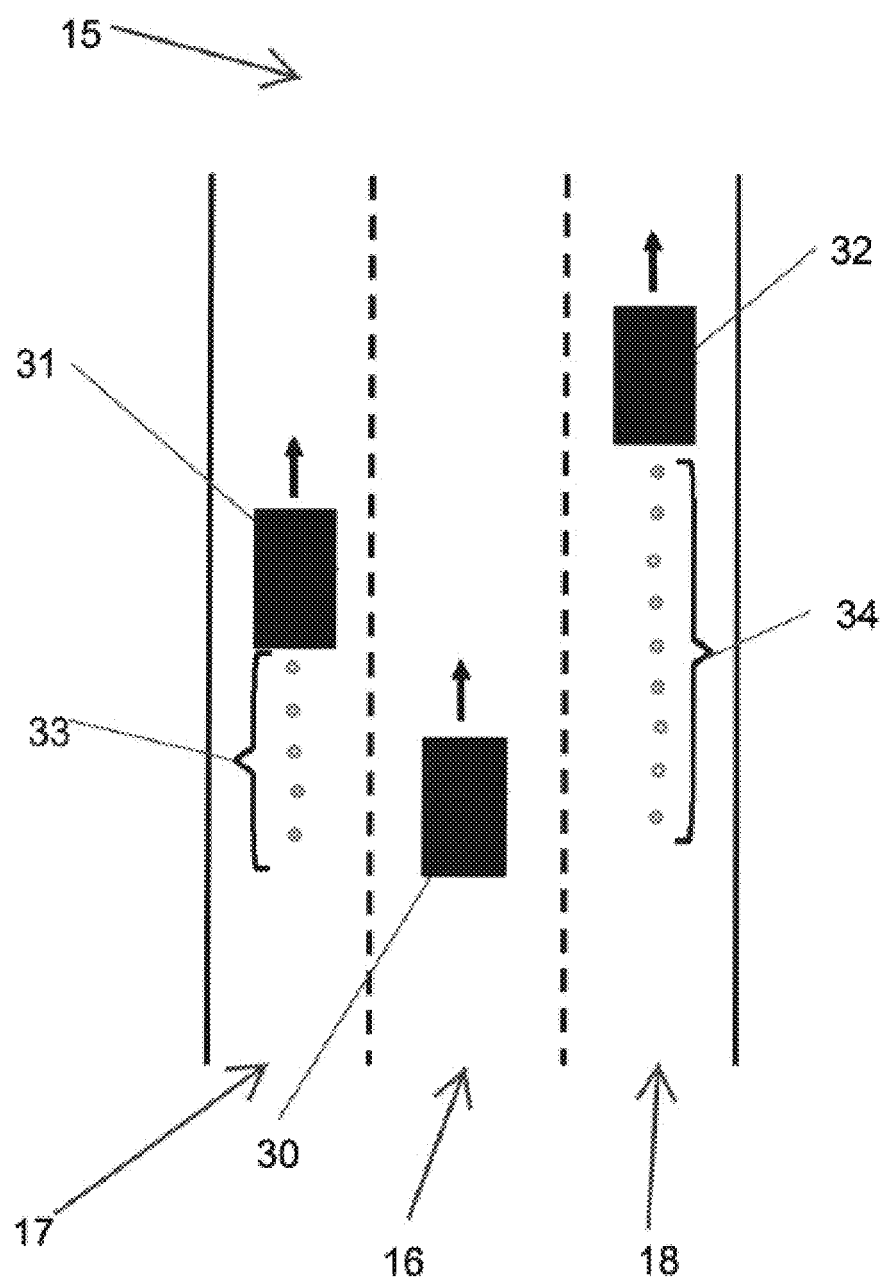
FIG. 5 shows a schematic bird's-eye view of a vehicle fitted with a system according to an embodiment of the present invention.

FIG. 5 shows an ego vehicle 30 fitted with a driver assistance system including an apparatus according to a first embodiment of the present invention. For brevity, elements that are common between the scenario of FIG. 5 and the scenarios of FIGS. 2 and 3 are not described separately with respect to FIG. 5. Suffice to say that the ego vehicle 30 is driving along the central lane 16 of the road 15.

A first object 31 (a vehicle) is driving in the left lane 17 generally in the same direction as the ego vehicle 31. A second object 32 (a vehicle) is driving in the left lane 17 generally in the same direction as the ego vehicle 30.

The ego vehicle 30 is fitted with at least one sensor. One of the sensors may, for example, be a vehicle RADAR or a LIDAR. The driver assistance system uses the data from the sensor to measure and determine the positions of objects within the field of view of the sensor (s) that are located in the vicinity of the ego vehicle 30. In the scenario shown in FIG. 5, the driver assistance system has detected two objects: the first and second object 31, 32. For each of the first and second objects 31, 32 the driver assistance system sequentially measures and determines the position of the respective object 31, 32. The measurements are made periodically, although this is not a requirement of the present invention. What is important is that a sequence of position measurements are made. The object position sequence for the first object 31 is illustrated by the first object position sequence 33. The object position sequence for the second object 32 is illustrated by the second object position sequence 34.

If the first object 31 travels within the left lane 17, then it will be appreciated that the first object position sequence generally follows the course of the left lane 17. Equally, if the second object 32 travels within the right lane 18, then it will be appreciated that the second object position sequence 34 generally follows the course of the right lane 18. The first and second objects 31, 32 are each moving relative to the road 15. On the basis that it is likely that the first and second objects are each travelling down the center of a respective lane most of the time, then movement of the first and second objects generally maps their respective lane path.

Figure 6:
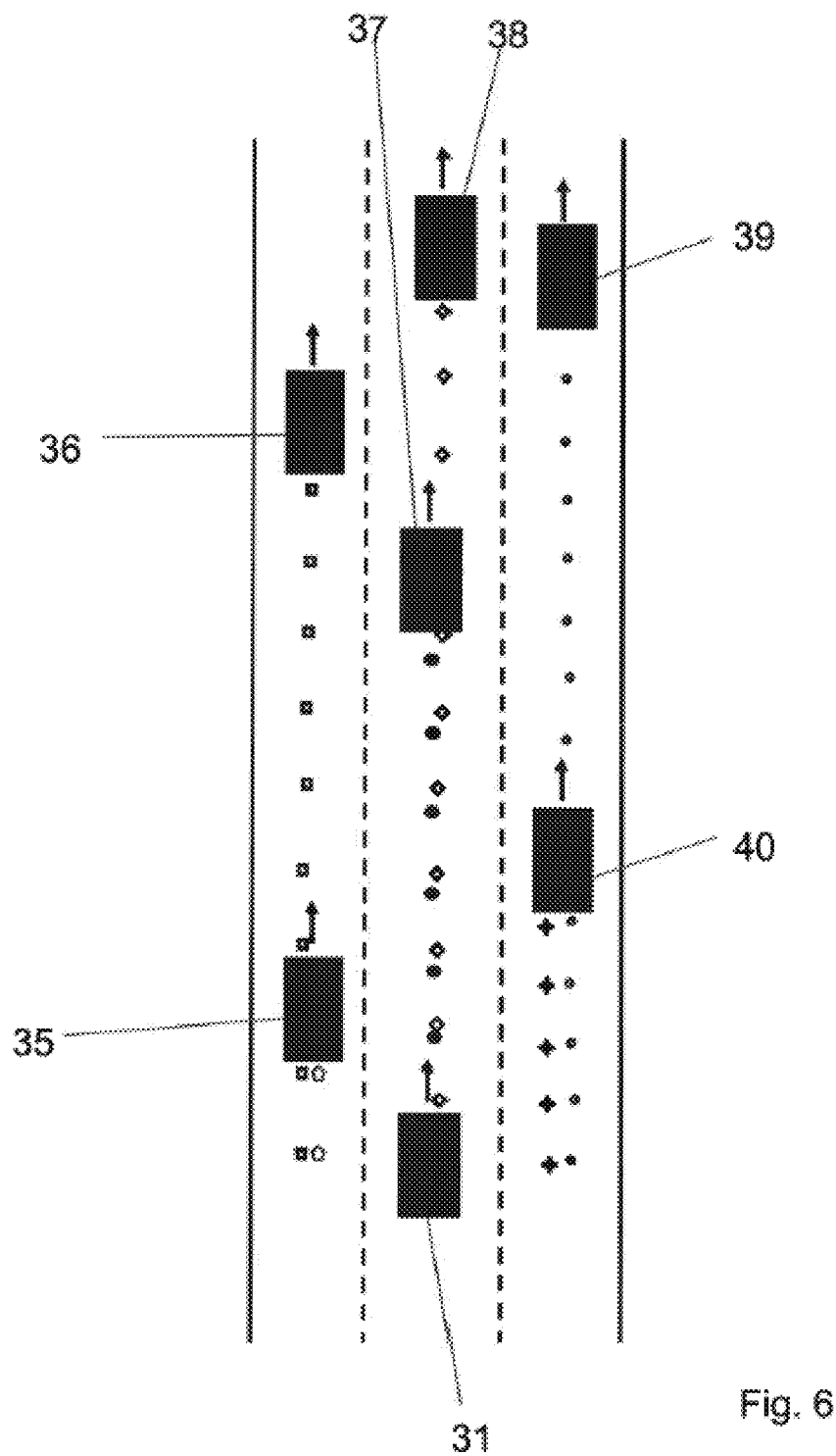
FIG. 6 shows another schematic bird's-eye view of a vehicle fitted with a system according to an embodiment of the present invention.

FIG. 6 shows a more complex scenario for the ego vehicle 30. In the scenario of FIG. 6, the ego vehicle 30 has detected six objects: the first to sixth objects 35, 36, 37, 38, 39, 40. The driver assistance system has sequentially determined the position of each of the six objects 35, 36, 37, 38, 39, 40 to form six separate object position sequences, shown as follows on FIG. 6:

First object 35—object position sequence shown by open pentagons;

Second object 36—object position sequence shown by open squares;

Third object 37—object position sequence shown by filled circles;

Fourth object 38—object position sequence shown by open diamonds;

Fifth object 39—object position sequence shown by open circles, and;

Sixth object 40—object position sequence shown by four-pointed stars.

Each measured position may be transformed into a rest-frame of the ego vehicle 31. Accordingly, compensation for motion of the ego vehicle may be achieved. For the avoidance of doubt the rest-frame of the vehicle means a coordinate system in which the ego vehicle is at rest, or not moving. The ego vehicle may be at the origin of the rest-frame coordinate system. The transformation into the rest frame is performed for each sequence of measured object positions for each time step (i.e. each time the functions are evaluated) to compensate for motion of the ego vehicle.

Objects that are not moving relative to the road, i.e. static objects such as trees, road signs or other road furniture, may be discarded. A discarded object is not used in any further processing and cannot therefore be grouped into a group of objects. A discarded object cannot therefore contribute to a swarm function.

Figure 7:
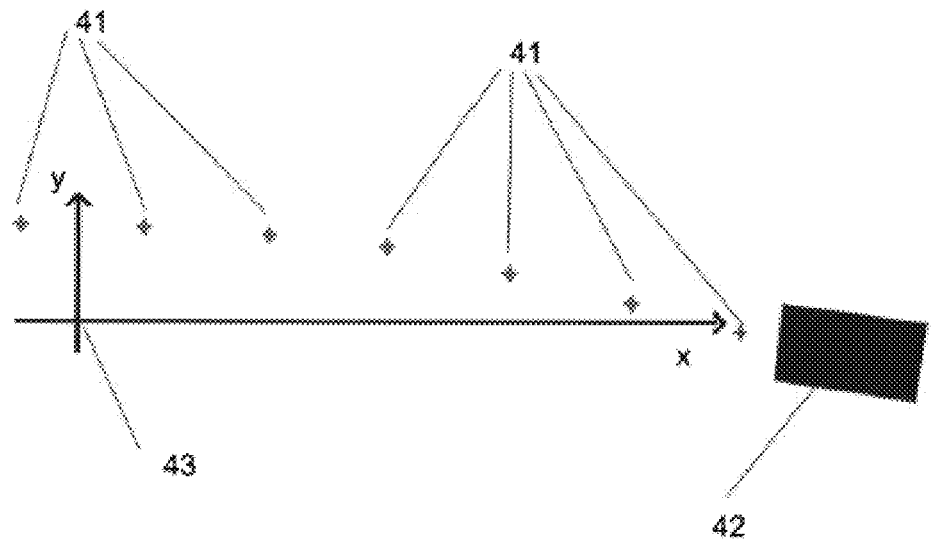
FIG. 7 shows a schematic plot of an object position sequence and position track.

FIG. 7 illustrates a single object position sequence 41 for an object 42. The object position sequence 41 is shown on an x, y coordinate system in the rest-frame of the ego vehicle 31. The origin 43 of the coordinate frame is the location of the ego vehicle 31. The current position of object 42 is shown as a schematic vehicle. The object position sequence 41 is plotted relative to the origin 43. In other words, regardless of the frame of reference in which the sensors on the ego vehicle measure and determine the position of the object 42, the positions are transformed into the rest-frame of the ego vehicle. An apparatus in accordance with the present invention captures a number of object position sequences.

For each object position sequence like that shown in FIG. 7, an object track is determined, which approximates the object position sequence. The object track is a mathematical function that best fits the object position sequence, i.e. in the terminology of FIG. 7, y(x) is determined, where y(x) is the function of x that best fits the data y. y(x) corresponds to the object track for the corresponding object.

The mathematical form for the path of a lane on a road is typically well-modelled by a double-clothoid function. A double-clothoid function is a mathematical function of the form:

$$y(x) = \begin{cases} y_0 + \tan(\alpha) \cdot x + C_0^m \cdot \frac{x^2}{2} + C_1^m \cdot \frac{x^3}{6}, & x < x_t \\ y_0 + \tan(\alpha) \cdot x + C_0^m \cdot \frac{x^2}{2} + C_1^m \cdot \left( \frac{x_t^3}{6} + \frac{x \cdot (x - x_t) \cdot x_t}{2} \right) + DC_1^m \cdot \frac{(x - x_t)^3}{6}, & x \geq x_t \end{cases}$$

wherein $\alpha$ is the heading angle (the angle of the first clothoid function at x=0), $C_0^m$ is the curvature at x=0; $C_1^m$ is the constant curvature variation of the first clothoid function; $DC_1^m$ is the constant curvature variation of the second clothoid function, and; $x_t$ is the value of x at the transition between the first and second clothoid functions that together form the double clothoid function.

Figure 8:
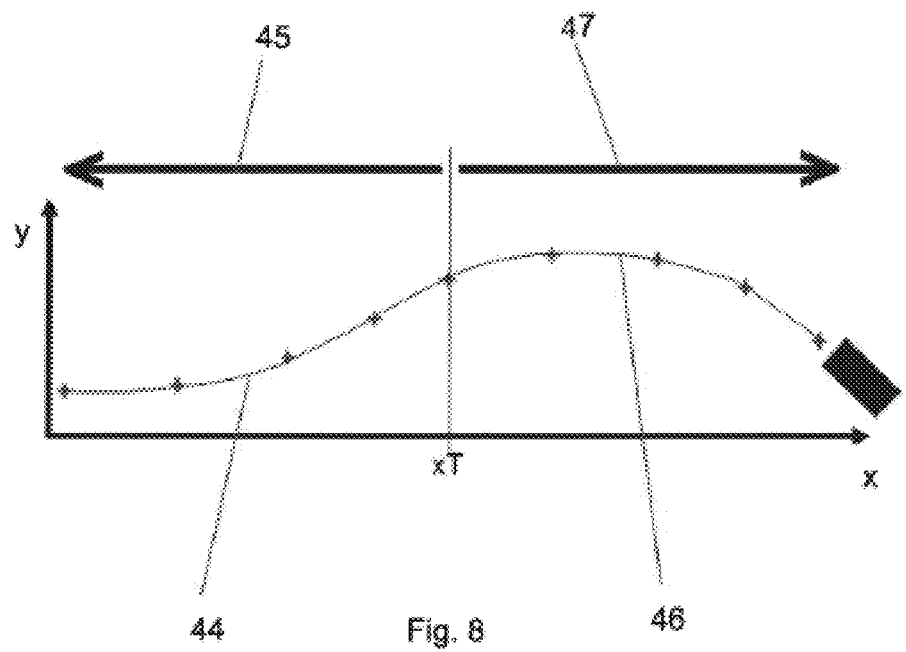
FIG. 8 shows a schematic plot of an object position sequence and position track.

However, fitting a clothoid function is computationally intensive. The inventors have found that it is computationally simpler to fit a double-polynomial function to each object track. An example third order double polynomial function is as follows:

$$y_{Objt}(x) = \begin{cases} y_1 = a_0 + a_1 \cdot x + a_2 \cdot x^2 + a_3 \cdot x^3, & x < xT \\ y_2 = b_0 + b_1 \cdot x + b_2 \cdot x^2 + b_3 \cdot x^3, & x \geq xT \end{cases}$$

Where y1 constitutes a first segment of the double polynomial and y2 constitutes the second segment of the double polynomial. $a_0$, $a_1$, $a_2$, and $a_3$ are the coefficients of the first polynomial; $b_0$, $b_1$, $b_2$, and $b_3$ are the coefficients of the second polynomial. The coefficients of the first and second polynomials are the fitted parameters when determining an object track. An example of such a fitted double polynomial function is shown in FIG. 8. The first segment 44 of the double polynomial is shown in the first region 45, where x<xt; the second segment 46 of the double polynomial is shown in the second region 47, where x≥xt.

The fitting of polynomial functions to a sequence of data is a well-known process, which will not be described in detail. Nevertheless, an example method is least-squares fitting. However, a number of constraints are used during the object track fitting specifically.

First, value of xt is determined, xt being the value of x at which the double polynomial function changes between the first and second segments of the double polynomial 44, 46 (see FIG. 8) for each object track.

Figure 9:
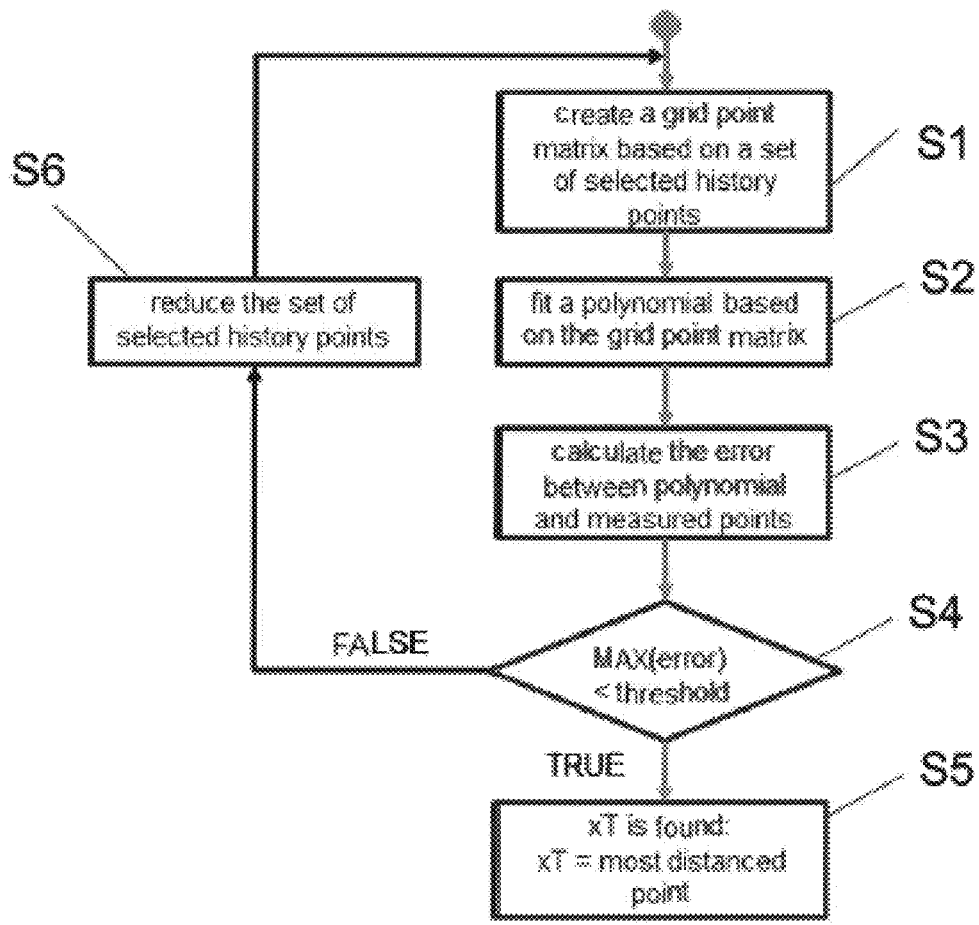
FIG. 9 shows an overview of a method for determining xt, as denoted in FIG. 8.

FIG. 9 shows an overview of a method for determining the transition value, xt. The method is an iterative process for finding xt.

The first step S1, on the first iteration, is to create a grid point matrix based on all of the points in a single objection position sequence 41 corresponding to one object track. In the first step on the first iteration, there is no selection of points from the object position sequence—all of the points are used.

Figure 10:
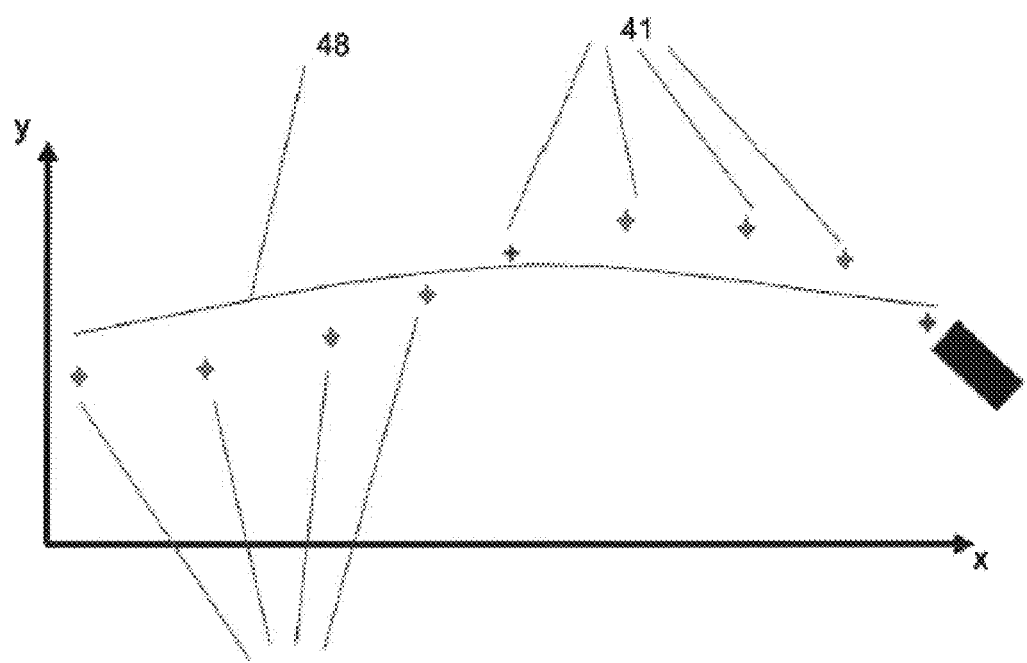
FIG. 10 shows a schematic plot illustrating a step of the method of FIG. 9.

The second step S2 is fitting a single polynomial based on the grid point matrix. An example of such a single polynomial is shown in FIG. 10. The single polynomial 46 has been fitted to the object position sequence 41.

Figure 11:
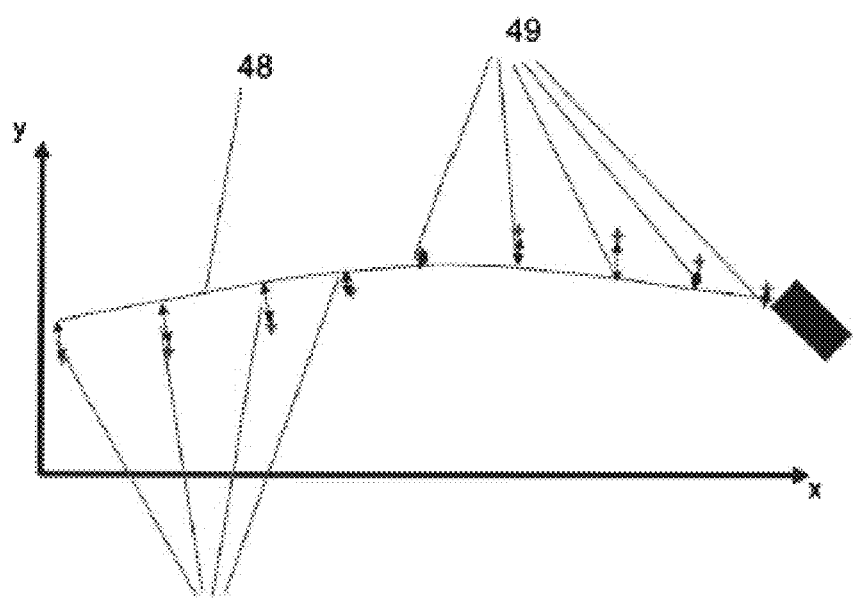
FIG. 11 shows a schematic plot illustrating another step of the method of FIG. 9.

The third step S3 is calculating the difference 49 between each object position in the object position sequence and the single polynomial 48, as shown in FIG. 11.

The fourth step S4 involves determining the maximum value of the differences 49 between each object position in the object position sequence and the single polynomial 48. If the maximum value of the differences is greater than or equal to a predetermined threshold, then a reduced set of history points is produced (this is the FALSE decision path shown in FIG. 9). If the maximum value of the differences is less than the predetermined threshold (the TRUE decision path shown in FIG. 9), then xt is equal to the measured object position that is most distant from the fitted single polynomial (step S5 in FIG. 9).

Returning briefly to the fourth step S4, which involves testing whether the maximum value of the differences is greater than or equal to a predetermined threshold. When the condition tested in the fourth step S4 is FALSE, a reduced set of object positions is produced. Specifically, the object position that is identified as being farthest from the single polynomial is removed from the object position sequence, thereby forming the reduced set of object positions. The first to fourth steps S1 to S4 are then repeated on the reduced set of object positions. This processing is repeated until step S4 tests TRUE, whereupon xt is determined.

For each object position sequence, a double polynomial is fitted to points making up the sequence. This fitted double polynomial function corresponds to the object track. During the fitting process, additional constraints, which utilise the transition between the first and second polynomials in the double polynomial at the point xT (xT is equal to xt: both are the transition value of x), may be used. Example constraints are as follows:

$$y_1(x = xT) == y_2(x = xT)$$
$$\frac{dy_1}{dx}(x = xT) == \frac{dy_2}{dx}(x = xT)$$
$$\frac{d^2y_1}{dx^2}(x = xT) == \frac{d^2y_2}{dx^2}(x = xT)$$

As will be appreciated these three constraints correspond to the equality of the two polynomials ($y_1$, $y_2$), the first derivative of the two polynomials with respect to x, and the second derivative of the two polynomials with respect to x, each evaluated at the transition value, xT.

Figure 12:
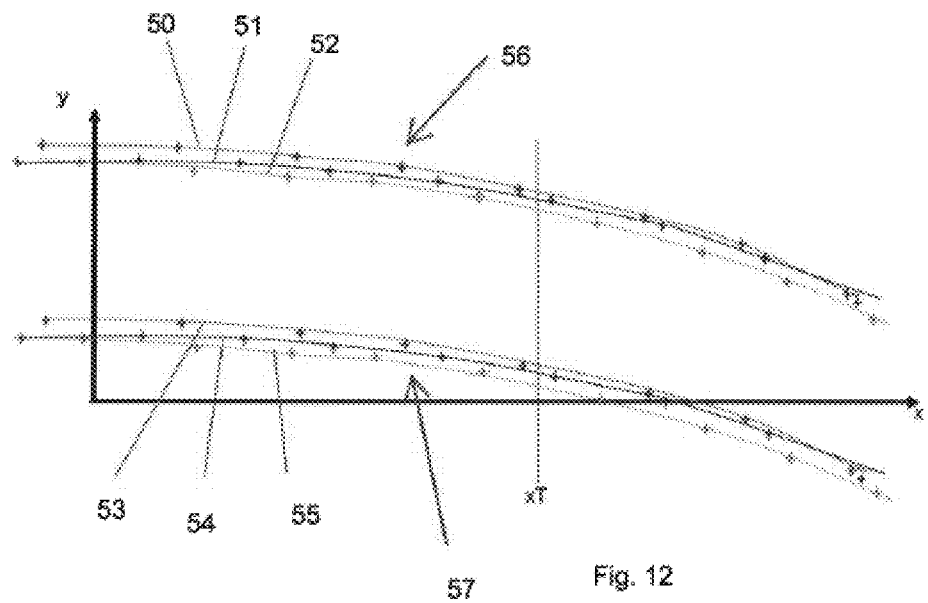
FIG. 12 shows a schematic plot illustrating two object groups.

FIG. 12 shows six object position sequences with six corresponding objects tracks 50, 51, 52, 53, 54, 55 that have each been fitted to the respective object position sequence according to the method described above. Each object track 50, 51, 52, 53, 54, 55 is described by a double polynomial of the form:

$$y_{Objt}(x) = \begin{cases} y_1 = a_0 + a_1 \cdot x + a_2 \cdot x^2 + a_3 \cdot x^3, x < xT \\ y_2 = b_0 + b_1 \cdot x + b_2 \cdot x^2 + b_3 \cdot x^3, x \geq xT \end{cases}$$

The six object tracks generally correspond to two groups 56, 57 of object tracks. The object tracks can therefore be sorted and grouped together into two object groups, which are referred to hereinafter as 'swarms'.

With the above double polynomial description of the object tracks, it will be noted that $a_0$ is a constant term in the double polynomial function. In FIG. 12, $a_0$ corresponds to the y-intercept of the corresponding object track. It will be also be noted that the three object tracks which are grouped into the first object swarm 56 have similar y-intercepts (i.e. values of $a_0$); the three object tracks which are grouped into the second object swarm 57 also have similar y-intercepts (i.e. values of $a_0$), but which are different from the $a_0$ values for the first swarm 56.

Figure 13:
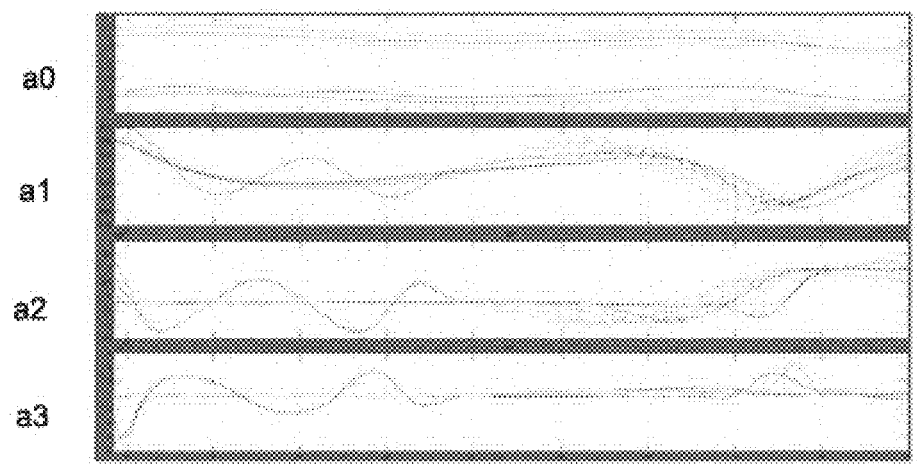
FIG. 13 shows four plots of the coefficients of the object tracks.

FIG. 13 shows the values a0, a1, a2, and a3 as a function of time. Each plot shows the value of a corresponding polynomial coefficient (a0, a1, a2, and a3) as a function of time. At any given sample time the values of a0, a1, a2, and a3 are of course constants for a given track. The plots illustrate that the coefficient a0 can be taken to group object tracks not only at a given time, but also the values of a0 remain grouped over the course of a period of time, thus allowing the formation of object swarms corresponding to different traffic lanes. It is clear from the top plot of FIG. 13, which shows the values of a0, that a0 is an excellent discriminator between object swarms. Remembering that the objects for which measurements are being made correspond to vehicles travelling in lanes on a road, the path along which objects in an object swarm generally corresponds to a lane. By using multiple objects for each swarm, it is possible to determine more accurately the lane position by reducing noise (e.g. minor deviations of driving path within the lane and occasional lane changes being within one of the object tracks within an object swarm, for example).

Each of the object swarms corresponds to a plurality of object tracks and each object track corresponds to an object position sequence. The next stage is to fit a double polynomial function (referred to hereinafter as a 'swarm function') to the object positions corresponding to all of the objects in a particular object swarm. In other words, one double polynomial function is determined for each object swarm. The double polynomial has the form:

$$y_{Objt}(x) = \begin{cases} y_1 = a_0 + a_1 \cdot x + a_2 \cdot x^2 + a_3 \cdot x^3, x < xT \\ y_2 = b_0 + b_1 \cdot x + b_2 \cdot x^2 + b_3 \cdot x^3, x \geq xT \end{cases}$$

Figure 14:
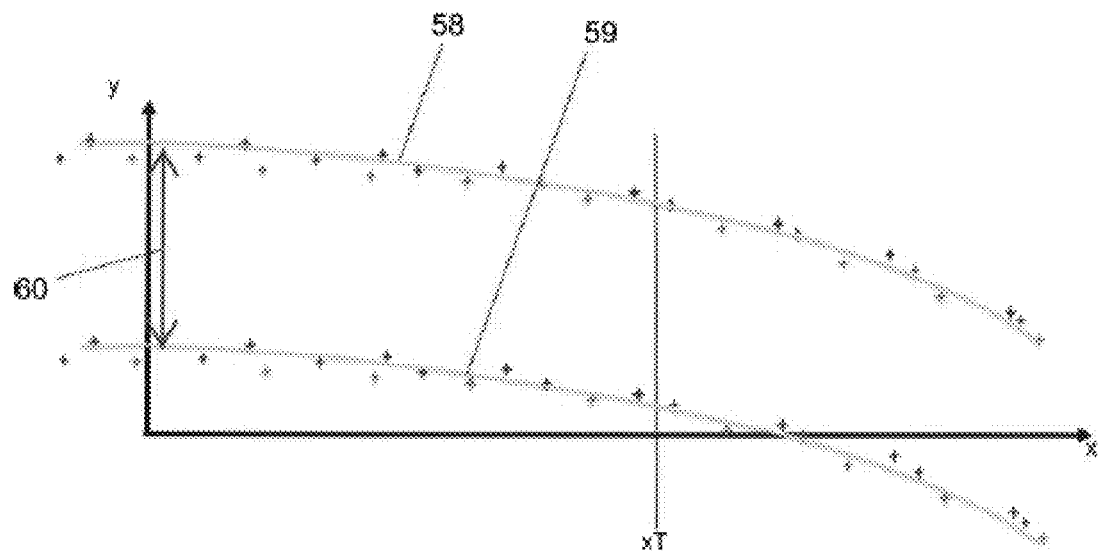
FIG. 14 shows a schematic plot showing two swarm functions, which are generated via the present invention.

The process for fitting the swarm function is the same as that described above for an individual object but using different data. FIG. 14 shows two swarm functions 58, 59, each corresponding to an object swarm. Each swarm function 58, 59 corresponds to the center line of a lane on a road. Because the center line of each of two adjacent lanes has been identified (a left lane and right lane), the distance 60 between the center lines corresponds to the lane width. The lane width accordingly may be determined by:

$$LW = \min(LANE\_WIDTH\_MAX\_VALUE, (a_{0,L} - a_{0,R}))$$

Where LW is the lane width; min(n, m) is function that returns the smaller of m and n; $a_0$, L is the $a_0$ value of the left lane swarm function 58 and $a_0$, R is the $a_0$ value of the right lane swarm function 59. Accordingly, the lane width, LW, is equal to the distance between the swarm functions of two lanes, unless ($a_{0,L} - a_{0,R}$) is found to be greater than LANE_WIDTH_MAX_VALUE (in the example function above), in which case the lane width is set to LANE_WIDTH_MAX_VALUE. In this way, if two swarm functions do not in fact correspond to two adjacent traffic lanes, then the min function above prevents an unrealistically large lane width, LW, being derived (which may otherwise correspond to two adjacent lanes separated by more than a realistic lane width. LANE_WIDTH_MAX_VALUE make take any reasonable value. LANE_WIDTH_MAX_VALUE may be approximately equal to a standard real-world lane width. Example values for LANE_WIDTH_MAX_VALUE include 3.5 metres or 3.75 metres.

Each swarm lane function corresponds to the center line of a lane. It will be appreciated that there is usually no real-world lane marking down the center of a traffic lane. However, the boundaries of the lane can also be derived using the swarm function and the lane width.

Figure 15:
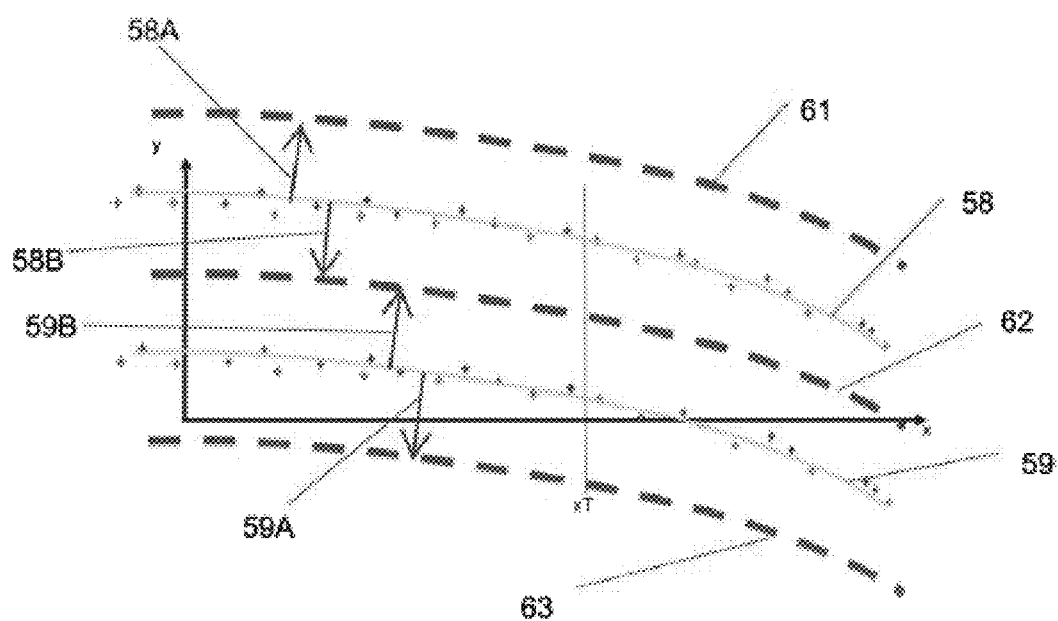
FIG. 15 shows a schematic plot showing the formation of boundary lines.

FIG. 15 shows the left lane swarm function 58 and the right lane swarm function 59. A respective left lane portion and right lane portion are defined. Each of the left lane portion and the right lane portion correspond to a swarm lane portion. Each lane portion includes a pair of lane boundaries. The left lane portion includes a left lane boundary 61 and a central lane boundary 62. The right lane portion includes a right lane boundary 63 and the central lane boundary 62.

The left lane boundary is offset 58A from the first swarm function 58 by half the lane width. The central lane boundary is offset 58B from the first swarm function 58 by half the lane width. The central lane boundary is offset 59B from the second swarm function 59 by half the lane width. The right lane boundary 63 is offset 59A from the second swarm function 59 by half the lane width. The functional forms of the left lane boundary, right lane boundary and central boundary are therefore equal to their corresponding swarm function plus/minus half the lane width.

A particular lane can therefore be defined by the functions of its corresponding lane boundaries. For example, in the scenario of FIG. 15, the left lane can be defined by the left lane 61 boundary and the central lane boundary 62; the right lane can be defined by the right lane 63 boundary and the central lane boundary 62. At this stage, the right lane boundary, left lane boundary, and central lane boundary have a double polynomial form.

The double polynomial form for each of the lane boundaries may be thought of as an intermediate polynomial form. A subsequent stage of conversion to a double clothoid form is possible, as follows.

As above, the double polynomial form, for each of the swarm functions (and accordingly defining the lane portions, defined in terms of the lane boundaries), is as follows:

$$y_{Objt}(x) = \begin{cases} y_1 = a_0 + a_1 \cdot x + a_2 \cdot x^2 + a_3 \cdot x^3, x < xT \\ y_2 = b_0 + b_1 \cdot x + b_2 \cdot x^2 + b_3 \cdot x^3, x \geq xT \end{cases}$$

The double clothoid has the form:

$$y(x) = \begin{cases} y_0 + \tan(\alpha) \cdot x + C_0^m \cdot \frac{x^2}{2} + C_1^m \cdot \frac{x^3}{6}, x < x_t \\ y_0 + \tan(\alpha) \cdot x + C_0^m \cdot \frac{x^2}{2} + C_1^m \cdot \left(\frac{x_t^3}{6} + \frac{x \cdot (x - x_t) \cdot x_t}{2}\right) + DC_1^m \cdot \frac{(x - x_t)^3}{6}, x \geq x_t \end{cases}$$

The coefficients of the double clothoid are related to the coefficients of the double polynomial as follows:

$y_0 = a_0$
$\alpha = a \tan(a_1)$
$C_0^m = a_2$
$C_1^m = 6 \cdot a_3$
$DC_1^m = 6 \, b_3$ By using these relations, each swarm lane portion can be generated and described in a double clothoid form, the exact values of the coefficients of the double clothoid being mapped from the double polynomial that was ultimately derived from grouped object tracks using the above relations.

Figure 16:
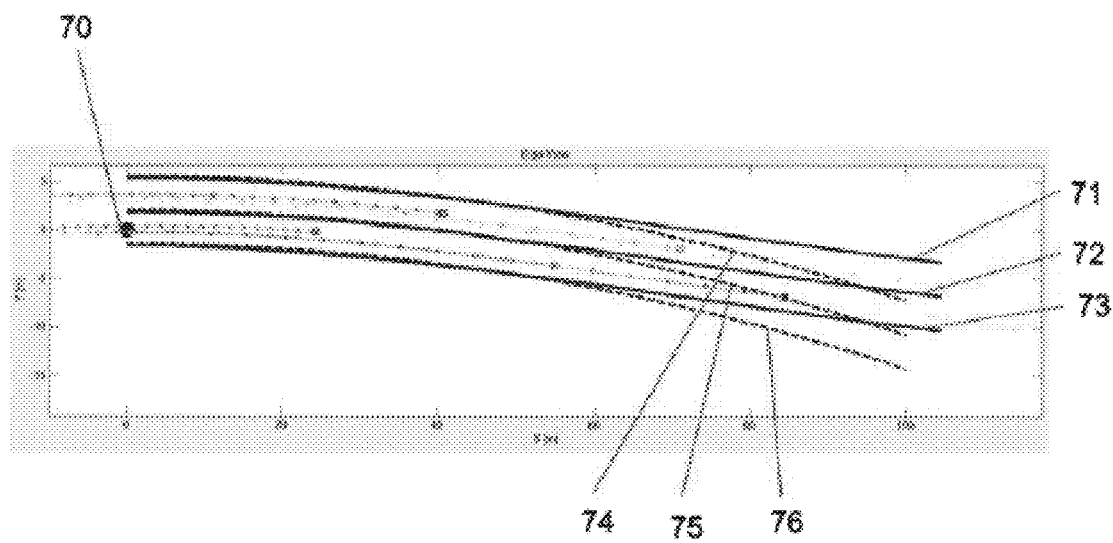
FIG. 16 shows a plot that illustrates a simulation of a system according to the present invention.

FIG. 16 shows the results of a simulation of using an apparatus for a driver assistance system as described above to generate swarm lane portions. The results of generating swarm lane portions is compared with extrapolating lane markings identified using a camera on the ego vehicle.

In FIG. 16, the ego vehicle 70 is located at (0, 0) on the coordinate system (i.e. the origin of the ego vehicle's rest frame). Six object position sequences are shown. It will be appreciated that the object position sequences may be of different lengths, indeed, in reality, it is likely that they will be. A swarm lane portion is the area between a corresponding pair of lane boundaries 71, 72, 73. As demonstrated in the example shown in FIG. 16, the swarm lane portions follow the routes of the objects (vehicles) to over 100 metres ahead of the ego vehicle 70. The objects (vehicles) travel along real world traffic lanes. Thus, the swarm lane portions follow and the real world traffic lanes more than 100 metres ahead of the ego vehicle 70.

The lane markings derived from the camera mounted to the ego vehicle 70 are designated by the dashed road markings 73, 74, 75. The lane markings derived from the camera begin to deviate from the swarm lane portions approximately 50 metres from the ego vehicle. Above 50 metres from the ego vehicle, the lanes derived from the camera do not follow the object tracks, and thus do not follow the real-world lanes on the road. Accordingly, utilising those lanes derived from the camera in a driving aid would not reflect the reality of the driving situation.

A swarm lane portion may be used as the only method of determining the position of a lane. For example, when the road markings are not detectable by a sensor on the vehicle because they are obscured from view (for example, by snow on the road, or by traffic), it is still possible to determine swarm lane portions. The swarm lane portions can be derived regardless of whether lane markings are detectable by sensors on the ego vehicle.

A swarm lane portion may be used as an extension to a lane derived using data from a camera. The parameters of the lane derived using camera data may be fused with parameters of the lane derived using the swarm lane portion generation described above. This data fusion can allow for the generation of a lane that extends further from the ego vehicle than lanes derived using a sensor on the vehicle to determine lane position. The swarm lane portions more accurately reflect the true position of the lanes on the road on which vehicles travel for a longer distance from the ego vehicle, even when lane markings are not visible.

An input into the system may be lane portions derived using data from a camera sensor. The apparatus may combine the lane portions using data from the camera sensor with the swarm lane portions. Together a more accurate lane can be generated.

In general, by measuring positions sequence for a plurality of objects, the apparatus for a driver assistance system according to present invention derives the position of the traffic lanes. The position of the traffic lanes is thus generated without any requirement to observe or detect any road markings using a sensor. If road markings are detected using a sensor, then the lane information derived therefrom may be combined with the swarm lane information.

The swarm lanes can be used by a number of driver assistance functionalities for which the position of traffic lanes is useful.

The apparatus of the present invention may be configured to make the swarm lanes available for use by at least one driver assistance function. The at least one driver assistance function may configured to use the swarm lanes information as an input into its decision making processing. The driver assistance function may be configured to notify the user of a danger based on vehicles located in the swarm lane portions, for example. As another example, a AAC system may be configured to control the speed of a vehicle on the basis of vehicles located in the swarm lanes.

Because the present invention is able to determine the location of traffic lanes out to large distances, the functionality of driver assistance systems is improved because the situational awareness of the system is improved. For example, because traffic lane positions are determined to a greater distance from the ego vehicle.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

While the above description constitutes the preferred embodiment of the present invention, it will be appreciated that the invention is susceptible to modification, variation and change without departing from the proper scope and fair meaning of the accompanying claims.

The invention claimed is:

1. An apparatus for a motor vehicle driver assistance system, comprising the apparatus being operable to determine the position of a portion of at least one lane of a road on which a vehicle is travelling, the apparatus being configured to:
    determine an object position sequence for each of a plurality of objects based on data from a sensor on the vehicle;
    generate an object track to approximate each of the respective object position sequences;
    sort the object tracks in to at least one object group according to a value of at least one parameter of each of the object tracks;
    for each of the object groups, generate a swarm function to approximate the object position sequences of the object tracks that are members of the respective object group and;
    generate a swarm lane portion according to the swarm function, the swarm lane portion representing a portion of a lane,
    wherein the object track has an object track function in the form of a double polynomial form including a first polynomial function and a second polynomial function, the first and second polynomial functions being equal at a polynomial point of equality.

2. An apparatus according to claim 1 further comprising, wherein the apparatus is further configured to transform each of the object position sequences into a rest-frame of the vehicle.

3. An apparatus according to claim 1 further comprising, the apparatus further configured to discard the objects that are static relative to the road on which the vehicle is travelling.

4. An apparatus according to claim 1 further comprising, wherein the swarm function defines a center line of a corresponding of the swarm lane portion.

5. An apparatus according to claim 4 further comprising, the apparatus configured to generate a left lane line with a left lateral offset from the center line and a right lane line with a right lateral offset from the center line.

6. An apparatus according to claim 5 further comprising, wherein the right lateral offset is equal to the left lateral offset, which is equal to half of a lane width.

7. An apparatus according to claim 1 further comprising, wherein the swarm lane portion extends forwards from the vehicle to a maximum swarm lane distance.

8. An apparatus according to claim 1 further comprising, wherein the apparatus is configured to receive an input lane portion derived using a detection of road markings by one or more sensors mounted to the vehicle, wherein the input lane portion extends forwards from the vehicle to a maximum input lane distance, and wherein the swarm lane portion extends beyond the maximum input lane distance.

9. An apparatus according to claim 1 further comprising, wherein the first derivative of the object track function evaluated at the polynomial point of equality is equal to the first derivative of the second polynomial function evaluated at the polynomial point of equality.

10. An apparatus according to claim 1 further comprising, wherein the second derivative of the object track function evaluated at the polynomial point of equality is equal to the second derivative of the second polynomial function evaluated at the polynomial point of equality.

11. An apparatus according to claim 1 further comprising, wherein the swarm function has a double clothoid form including a first clothoid function and a second clothoid function, the first and second clothoid functions being equal at a clothoid point of equality.

12. An apparatus according to claim 11 further comprising, wherein during the generation of the swarm function, an intermediate polynomial function is generated function to approximate the object position sequences of the object tracks that are members of the respective object swarm, and the swarm function is determined in terms of the intermediate polynomial function.

13. An apparatus according to claim 1 further comprising, wherein the object tracks are sorted according to a value of a constant term in each of the object tracks.

14. An apparatus according to claim 1 wherein the sensor on the vehicle includes a RADAR sensor or a LIDAR sensor.

15. An apparatus according to claim 1 wherein the sensor on the vehicle includes a pair of optical sensors configured as a stereo vision system.

16. An apparatus according to claim 1 wherein the apparatus is further configured to combine the swarm lane portion generated using the object position sequences with lane portions derived using data from a camera sensor.

17. A method for a motor vehicle driver assistance system, the method for determining the position of a portion of at least one lane of a road on which the vehicle is travelling, the method comprising the steps of:
    determining an object position sequence for each of a plurality of objects based on data from a sensor on the vehicle;
    generating an object track to approximate a respective object position sequence;
    sorting the object tracks in to at least one object group according to a value of at least one parameter of each of the object tracks;
    for each object group, generating a swarm function to approximate the object position sequences of the object tracks that are members of the respective object group; and
    generating a swarm lane portion according to the swarm function, the swarm lane portion representing a portion of a lane, wherein the object track has an object track function in the form of a double polynomial form including a first polynomial function and a second polynomial function, the first and second polynomial functions being equal at a polynomial point of equality.

18. The method of claim 17, further comprising combining the swarm lane portion generated using the object position sequences with lane portions derived using data from a camera sensor.

19. An apparatus for a motor vehicle driver assistance system, comprising the apparatus being operable to determine the position of a portion of at least one lane of a road on which a vehicle is travelling, the apparatus being configured to:

determine an object position sequence for each of a plurality of objects;

generate an object track to approximate each of the respective object position sequences, wherein the object track has an object track function in the form of a double polynomial form including a first polynomial function and a second polynomial function, the first and second polynomial functions being equal at a polynomial point of equality;

sort the object tracks in to at least one object group according to a value of at least one parameter of each of the object tracks;

for each of the object groups, generate a swarm function to approximate the object position sequences of the object tracks that are members of the respective object group and;

generate a swarm lane portion according to the swarm function, the swarm lane portion representing a portion of a lane.

* * * * *